United States Patent
Spangler et al.

(10) Patent No.: US 9,575,840 B1
(45) Date of Patent: Feb. 21, 2017

(54) RECOVERY ROLLBACK RISK REDUCTION

(71) Applicant: Google Inc., Mountain View, CA (US)

(72) Inventors: Randall R. Spangler, San Jose, CA (US); William Frank Richardson, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 14/461,192

(22) Filed: Aug. 15, 2014

(51) Int. Cl.
*G06F 11/14* (2006.01)

(52) U.S. Cl.
CPC ......... *G06F 11/1438* (2013.01); *G06F 11/142* (2013.01); *G06F 11/1417* (2013.01)

(58) Field of Classification Search
CPC .. G06F 11/1438; G06F 11/1417; G06F 11/142
See application file for complete search history.

(56) References Cited

U.S. PATENT DOCUMENTS

| 7,558,949 B2 | 7/2009 | Inada et al. |
| 7,849,454 B2 | 12/2010 | Lambert et al. |
| 2010/0031244 A1* | 2/2010 | Koba ............... G06F 8/65 717/168 |
| 2011/0087920 A1* | 4/2011 | Hendricks ........ G06F 21/554 714/21 |
| 2014/0310509 A1* | 10/2014 | Potlapally ........ G06F 21/57 713/2 |

OTHER PUBLICATIONS

Firmware Boot and Recovery, 7 pages, retrieved from <http://www.chromium.org/chromium-os/chromiumos-design-docs/firmware-boot-and-recovery>, visited Jul. 30, 2014.
Recovery Mode, 6 pages, retrieved from <http://www.chromium.org/chromium-os/chromiumos-design-docs/recovery-mode>, visited Jul. 30, 2014.

* cited by examiner

*Primary Examiner* — Dennis M Butler
(74) *Attorney, Agent, or Firm* — McDermott Will & Emery LLP (57) ABSTRACT

Aspects of the subject technology relate to executing a boot sequence from a recovery image. A determination of a validity of one or more keyblocks is made. A determination of a first version identifier and a second version identifier is made. A comparison of the first version identifier and the second version identifier is performed. A boot sequence from a recovery image is executed based on the comparison.

20 Claims, 7 Drawing Sheets

Please insert a storage device with a recovery image.

FIG. 7A

There was an error in verifying your recovery image. Please insert a storage device with a different recovery image.

FIG. 7B

The recovery image that you have provided may be outdated. Although the recovery process will proceed in five minutes, we recommend that you update your recovery image in the future.

Time remaining
4:32

705

FIG. 7C

RECOVERY ROLLBACK RISK REDUCTION

BACKGROUND

The present disclosure generally relates to the recovery of a computing system and, in particular, for example, to recovery rollback risk reduction.

Computing systems (e.g., desktop computers, laptops, netbooks, tablets, smart phones, mobile devices, servers, etc.) generally operate using a combination of firmware and software that is configured to execute on the hardware of a given computing system. A given set of firmware and software that is used to operate a computing system may be referred to as an operating image for the computing system.

SUMMARY

Aspects of the subject technology relate to a computing system. The computing system includes one or more processors and a non-transitory computer-readable medium including instructions stored therein, which, when executed by the one or more processors, cause the one or more processors to perform operations. The operations include detecting a first recovery image accessible to the computing system. The operations further include determining a validity of a first keyblock associated with the first recovery image. The operations further include, if the first keyblock is determined to be valid, determining a first version identifier associated with the first keyblock. The operations further include determining a second version identifier, where the second version identifier is contained in the computing system. The operations further include comparing the first version identifier with the second version identifier. The operations further include executing a boot sequence from the first recovery image based on the comparison.

Aspects of the subject technology also relate to a machine-implemented method. The method includes detecting a valid recovery image accessible to a computing system. The method further includes determining a first version identifier associated with the valid recovery image. The method further includes determining a second version identifier. The method further includes comparing the first version identifier with the second version identifier. The method further includes executing a boot sequence from the trusted recovery image based on the comparison.

Aspects of the subject technology also relate to a non-transitory machine-readable medium including instructions stored therein, which when executed by a system, cause the system to perform operations. The operations include detecting a valid recovery image accessible to the system. The operations further include determining a first version identifier associated with the valid recovery image. The operations further include determining a second version identifier, where the second version identifier is contained in the system. The operations further include determining, based on the first version identifier and the second version identifier, whether to impose a delay of a predetermined temporal duration prior to executing a boot sequence from the trusted recovery image. The operations further include executing the boot sequence from the trusted recovery image based on determining whether to impose a delay.

The description in this summary section may provide some illustrative examples of the disclosure. This section is not intended to be a broad overview or to identify essential elements of the disclosure.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology provides for a recovery mode with recovery rollback risk reduction. Recovery mode procedures may include verifying a recovery image as being from a trusted supplier and booting a computing system from the recovery image. The recovery mode procedures may allow a user to restore an operating image of a computing system to a known and trusted state using the recovery image. The recovery image may be provided by the user to the computing system through a removable storage device. For example, the user may have downloaded the recovery image from a website of a supplier of the recovery image and copied the recovery image into the removable storage device.

In accordance with one or more implementations, a user of a computing system can boot from a recovery image that may be deemed outdated by a supplier, while risks associated with allowing the computing system to boot from an outdated recovery image may be reduced. The outdated recovery image may contain security vulnerabilities for example. The executing of a boot sequence from the recovery image may be performed based on a comparison between a version identifier associated with the recovery image provided in the removable storage device of the user and a version identifier provided in the computing system.

Figure 1:
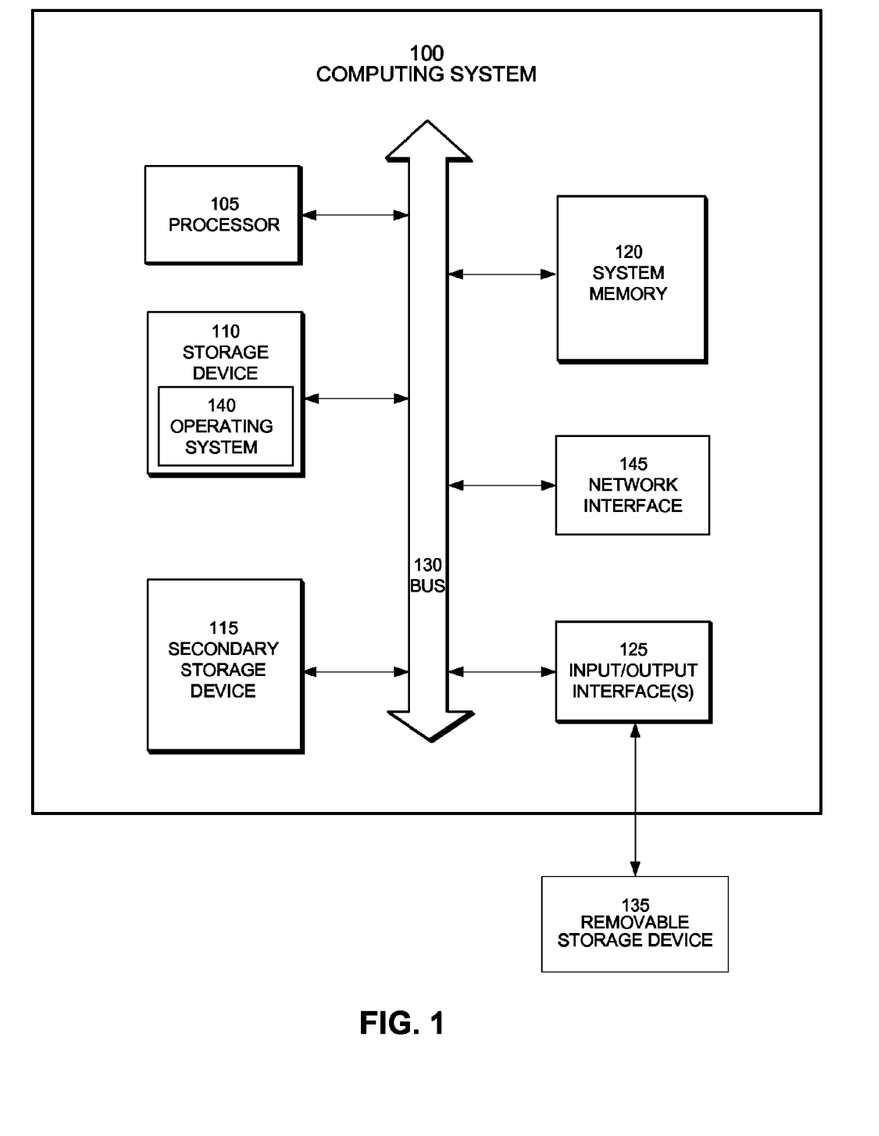
FIG. 1 is a block diagram illustrating a computing system, in accordance with one or more implementations.

FIG. 1 is a block diagram illustrating a computing system 100, in accordance with one or more implementations. The computing system 100 may be a laptop computer, a desktop computer, a tablet, a phone, a smart phone, a personal digital assistant (PDA), or other type of computing system. The computing system 100 includes a processor 105, storage device 110, secondary storage device 115, system memory 120, one or more input/output interfaces 125, and network interface 145, each of which may communicate with one another via a bus 130. A removable storage device 135 may be in communication with the computing system 100. The bus 130 collectively represents all system, peripheral, and chipset buses that communicatively connect the numerous components of the computing system 100.

The processor 105 may be configured to control the various components of the computing system 100 and perform various tasks by executing machine-readable instructions that are stored in the storage device 110, secondary storage device 115, system memory 120, and/or the removable storage device 135. In one or more implementations, the processor 105 may retrieve instructions to execute and data to process from the storage device 110, secondary storage device 115, system memory 120, and/or removable storage device 135 in order to perform the processes of the subject disclosure. The processor 105 may be a single processor, a multi-core processor, or multiple processors in different implementations.

The storage device 110 may include a non-volatile read-and-write memory that stores data and instructions that may be retrieved by the processor 105. The storage device 110 may be used to store an operating system (OS) 140. The storage device 110 may include a solid state drive, a magnetic disk drive, an optical drive, and/or other type of storage media.

The system memory 120 may include a volatile read-and-write memory, such as a random access memory (RAM), dynamic RAM (DRAM), cache memory, among others. The system memory 120 may also include read only memory (ROM), which stores static data and instructions that are needed by the processor 105 and other components of the computing system 100. The system memory 120 may store instructions and data that may be retrieved by the processor 105 at runtime.

The secondary storage device 115 may include non-volatile memory that stores data and instructions that may be retrieved by the processor 105. The secondary storage device 115 may be used to store firmware for booting the computing system 100. The secondary storage device 115 may include an erasable programmable read-only memory (EPROM), an electrically erasable programmable read-only memory (EEPROM), an embedded multimedia card (e-MMC), a NOR Flash, a NAND Flash, battery-backed RAM, and/or other type of non-volatile memory.

The firmware stored in the secondary storage device 115 may include instructions that may be executed by the processor 105 when booting the computing system 100. The instructions of the firmware (e.g., the boot stub) may be executed by the processor 105 to initiate a boot process and execute instructions that are stored in the storage device 110 (e.g., instructions executed to initiate booting the operating system 140 stored on the storage device 110). The instructions of the firmware may be executed by the processor 105 to determine whether to execute a recovery mode procedure on the computing system 100. If a recovery mode procedure is to be executed, the processor 105 may load and execute instructions that are stored on the secondary storage device 115, including those of the firmware, to execute the recovery mode procedure.

The secondary storage device 115 may be organized such that it includes a write-protected region/partition and a writable region/partition. The write-protected partition may have been written during the manufacture of the computing system 100 and locked to protect the code from being erased or altered. The write-protected partition may include the instructions for determining whether a normal boot mode should be executed or a recovery mode procedure should be executed. The write-protected partition may also include instructions for initiating the normal boot mode or the recovery mode procedure for the computing system 100. The writable partition of the secondary storage device 115 may include instructions for initiating system components or executing a portion of the boot or recovery process. Recovery mode procedures may include, for example, restoring an operating image of the computing system 100 (e.g., in the secondary storage device 115 and/or the storage device 110) to a known and trusted state. The instructions involved for recovery mode procedures may be digitally signed by a trusted supplier.

The one or more input/output interfaces 125 may be configured to communicate with various input/output devices such as video display units (e.g., liquid crystal displays (LCDs), cathode ray tubes (CRTs), or touch screens), an alphanumeric input device (e.g., a keyboard), a cursor control device (e.g., a mouse), or a signal generation device (e.g., a speaker). Some devices, such as a touch screen, may function as both input and output devices.

One or more input/output interfaces 125 may also be configured to communicate with a removable storage device 135. The removable storage device 135 may be an electronic storage device (e.g., flash drive), a magnetic storage device (e.g., hard drive, floppy disk, etc.), or an optical storage device. For example, the removable storage device 135 may be a removable data storage device such as a universal serial bus (USB) flash drive or a secure digital (SD) memory card, and the interface 125 may be, respectively, a USB data port or a SD card reader.

The network interface 145 may be configured to allow the computing system 100 to communicate with a network, for example, a local area network (LAN), a wide area network (WAN), an intranet, the Internet, etc. The network interface 145 may include a wireless communication module for communicating with the network over a wireless link (e.g., a WiFi wireless link, a cellular link, etc.). In some aspects, updates to data in the writable partition of the secondary storage device 115 may be provided to the computing system 100 through the Internet.

Figure 2:
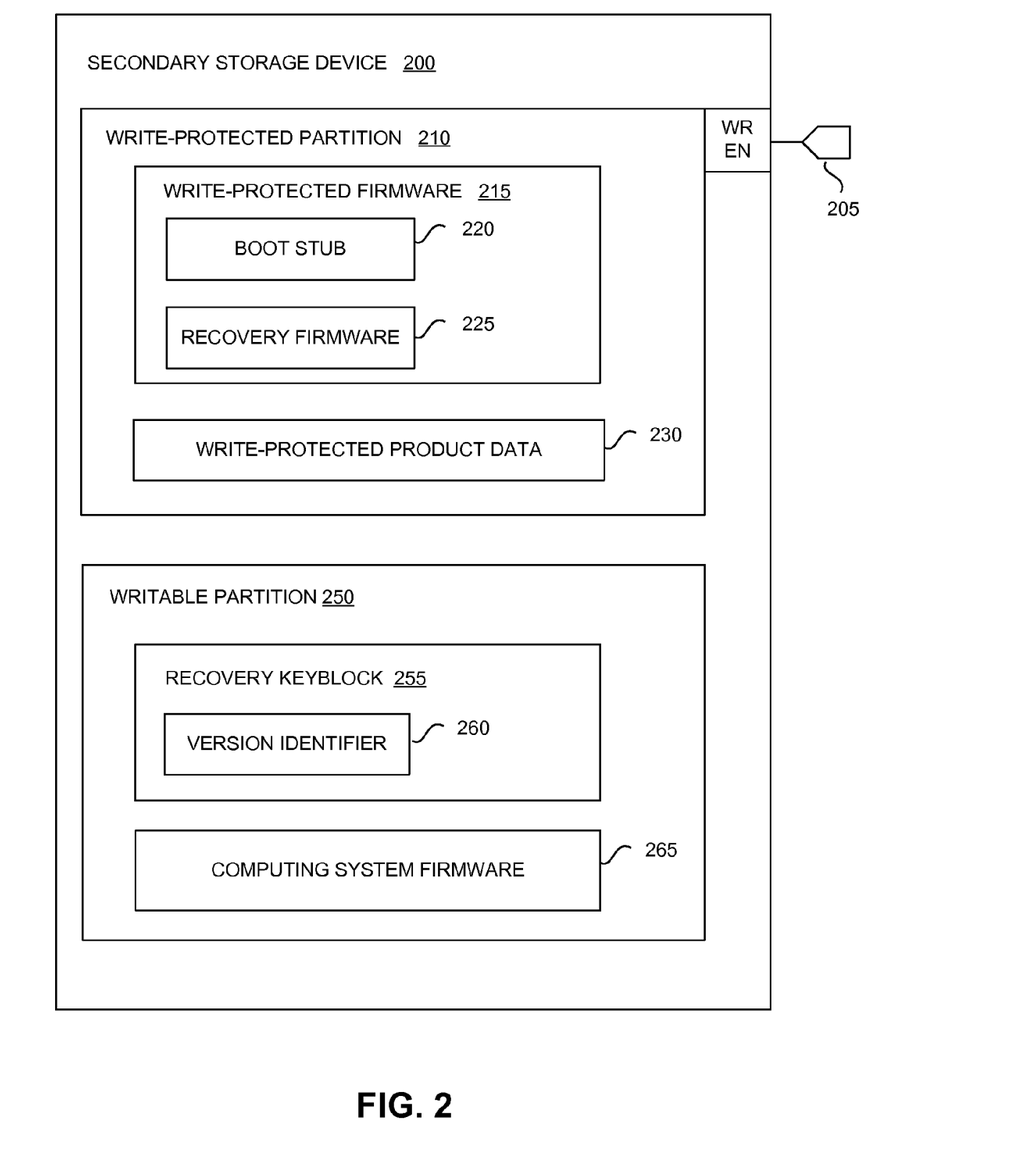
FIG. 2 is a block diagram showing a secondary storage device, in accordance with one or more implementations.

FIG. 2 is a block diagram showing a secondary storage device 200, in accordance with one or more implementations. The secondary storage device 200 may be implemented as the secondary storage device 115 in the computing system 100 of FIG. 1 for example. The secondary storage device 200 includes a write-protected partition 210 and a writable partition 250. The secondary storage device 200 may be configured to allow a processor, such as the processor 105 in FIG. 1, to read content in the write-protected partition 210, but not to erase or write content in the write-protected partition 210. The secondary storage device 200 may be configured to allow a processor to read and write content in the writable partition 250.

The secondary storage device 200 may include a write-enable pin 205 or write protection pin that controls whether content may be written in the write-protected partition 210. For example, the write-enable pin 210 may be pulled up to allow content to be written to the write-protected partition 210 and pulled down to prevent content from being written to the write-protected partition 210. In some aspects, content may be written to the write-protected partition 210 during manufacture of a computing system (e.g., 100 in FIG. 1) containing the write-protected firmware 215. Before the computing system is shipped from the manufacturer, the write-enable pin 205 or write-protection pin may be set to prevent content in the write-protected partition 210 from being rewritten. The content in the write-protected partition 210 cannot be easily rewritten by an attacker without physical access to internal circuitry of the computing system. Use of a write-enable pin 205 or write protection pin to write-protect the write-protected partition 210 is provided as an example, and other write-protection mechanisms may be used depending on the type of firmware utilized.

The write-protected partition 210 includes write-protected firmware 215 and write-protected product data 230. The write-protected product data 230 may include machine-specific information that is to remain fixed, such as manufacturer of a system, mother board serial number, media access control (MAC) address, among other information specific to the system.

The write-protected firmware 215 includes a boot stub 220 and recovery firmware 225. The boot stub 220 may include instructions for initiating a boot process of a system when executed by a processor. The boot stub 220 may also include a cryptographic key (e.g., a public key) that may be utilized to verify whether various portions of computing system firmware 265 are in an unexpected state (e.g., corrupted, modified, or missing). The recovery firmware 225 may include instructions for performing a recovery process when executed by a processor.

The writable partition 250 includes a recovery keyblock 255, in one or more implementations. The recovery keyblock 255 includes a version identifier 260 and may include additional data. In some aspects, the version identifier 260 provides version information associated with the recovery keyblock 255. In some aspects, the version identifier provides version information for an oldest (e.g., lowest) version of a recovery image recommended (e.g., by the supplier) for a recovery mode process. Alternatively or in conjunction, the version identifier may be stored in the writable partition 250 as a standalone piece of data that is accessible to a processor. Since the version identifier is in the writable partition 250, the version identifier may be updated to roll forward the version of the recovery mode recommended for the recovery mode process.

In one or more implementations, the recovery keyblock 255 may contain a digital signature. The digital signature may be utilized by the computing system 100 to verify that the recovery keyblock 255 is from a trusted/reliable source. For example, a cryptographic key stored in the boot stub 220 may be used to verify the digital signature.

The writable partition 250 also includes computing system firmware 265. The computing system firmware 265 may include instructions for system setup that, when executed by a processor, allow performance of an initial setup of components of the computing system 100. The instructions for system setup may include instructions that, when executed by a processor, allow initialization of certain components of the computing system 100 (e.g., a chipset) to enable a boot loader to load a kernel and an operating system of the computing system 100.

Figure 3:
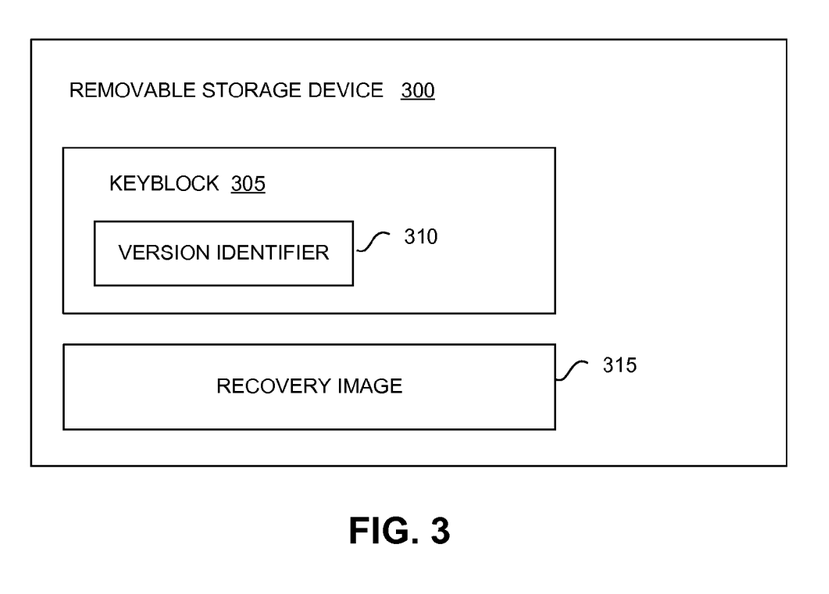
FIG. 3 is a block diagram showing a removable storage device containing a recovery image, in accordance with one or more implementations.

FIG. 3 is a block diagram showing a removable storage device 300 containing a recovery image 315, in accordance with one or more implementations. The removable storage device 300 may be, by way of non-limiting example, an electronic storage medium, an optical storage medium, or a magnetic storage medium, among other storage media. For example, the removable storage device 300 may be a USD flash drive or a SD memory card. In one or more implementations, the removable storage device 300 includes a keyblock 305 and a recovery image 315 associated with the keyblock 305. The keyblock 305 includes a version identifier 310 that provides version information of the recovery image 315, and the keyblock 305 may include additional data. The removable storage device 300 may be connected to or otherwise in communication with the computing system 100 of FIG. 1, and the computing system 100 may be configured to boot from a recovery image contained in the removable storage device 300.

In one or more implementations, the keyblock 305 may contain a digital signature. The digital signature may be utilized by the computing device 100 to verify that the recovery image 315 is from a trusted/reliable source. For example, a cryptographic key stored in the boot stub (e.g., 220 in FIG. 2) of the computing system 100 may be used to verify the digital signature.

The subject technology provides systems and associated methods for executing a boot sequence from a recovery image. Recovery mode procedures may include restoring an operating image of computing system to a known and trusted state. As an example, a user may wish to update the operating image of the computing device to a more recent version of the operating image. In this case, the user may have manually entered the recovery mode of the computing system, such as by providing a particular input within the first few seconds of a boot up process of the computing system. The particular input may be a particular key combination defined by the computing system for entering recovery mode for example. As another example, during a boot up process, the computing system may determine that the operating image of the computing system has been corrupted. Corruption of the operating image may be the result of a malicious act, which may include modification of the operating image of the computing device to install malicious software or malware, among other possible causes.

The recovery mode may boot from a recovery image that is provided by the user to the computing system through a removable storage device for example. In accordance with one or more implementations, a user of a computing system can boot from a recovery image that is deemed outdated by a supplier, which may contain security vulnerabilities, while risks associated with allowing the computing system to boot from an outdated recovery image may be reduced.

In some aspects, risks associated with an attacker who has physical access to the computing system and who attempts to install an outdated recovery image in order to subsequently exploit security vulnerabilities in the outdated recovery image may be reduced. The risks may be reduced by comparing version information associated with a recovery image stored in the removable storage device with version information stored in the computing system and, based on the comparison, determining when to boot from a recovery image stored in the removable storage device.

Figure 4:
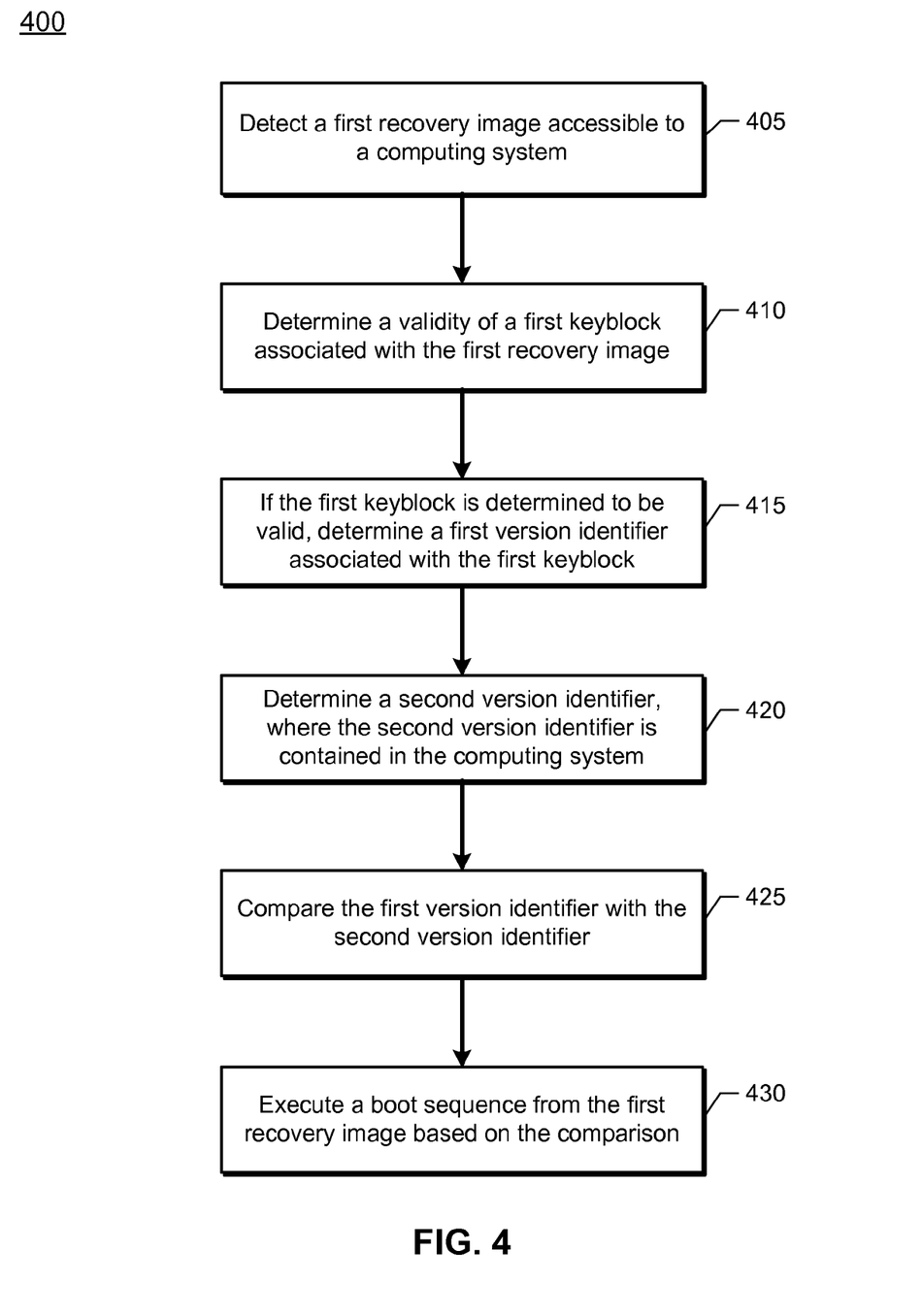
FIGS. 4 through 6 show flow diagrams illustrating example processes for executing a boot sequence from a recovery image, in accordance with various aspects of the subject technology.

FIG. 4 shows a flow diagram illustrating an example process 400 for executing a boot sequence from a recovery image, in accordance with various aspects of the subject technology. The blocks of the process 400 do not need to be performed in the order shown. It is understood that the depicted order is an illustration of one or more example approaches, and are not meant to be limited to the specific order or hierarchy presented. The blocks can be rearranged, and/or two or more of the blocks can be performed simultaneously. Additional, fewer, and/or different blocks may be performed.

For explanatory purposes, the example process 400 is primarily described herein with reference to the computing system 100 of FIG. 1, with instructions being executed by the processor 105 in the computing system 100. However, the example process 400 is not limited to the computing system 100 of FIG. 1, and the example process 400 may be performed by one or more components of the computing system 100.

At block 405, a first recovery image (e.g., 315 in FIG. 3) that is accessible to the computing system 100 is detected. The first recovery image may be contained in a storage device (e.g., 300 in FIG. 3) that is communicably connected to the computing system 100. For example, the storage device may be a removable machine-readable storage device that is in communication with the computing system 100, such as a USB flash drive or a SD memory card provided to a USB data port or a SD card reader of the computing system 100. Other storage devices that may be communicably connected to or otherwise provided to the computing system 100 may also be utilized.

Figure 7A:
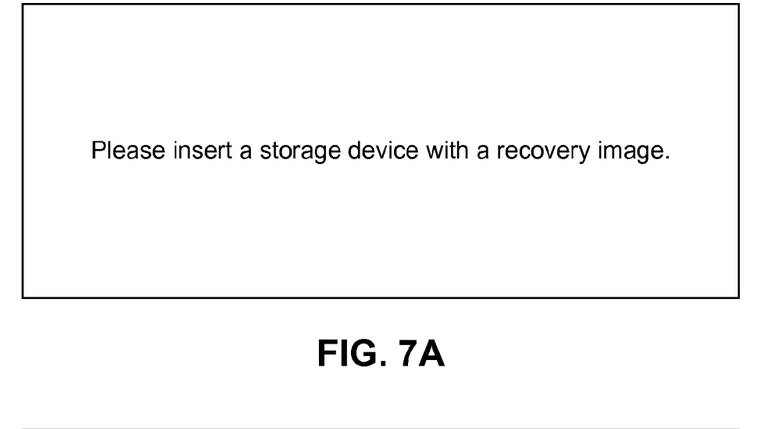
FIGS. 7A through 7C provide example screens that may be presented to a user.

A user of the computing system 100 may know to provide the first recovery image to the computing system 100 by way of a prompt or an instruction provided for display to the user by the computing system 100 once the computing system 100 has initiated recovery mode. For example, when recovery mode is initiated for the computing system 100, the computing system 100 may provide for display the example screen shown in FIG. 7A to prompt a user to provide a recovery image (e.g., insert a removable storage device that contains a recovery image) to the computing system 100. Other screens that include less or more information than the screen shown in FIG. 7A can be utilized.

At block 410, a validity of a first keyblock associated with the first recovery image is determined. The validity of the first keyblock is determined to verify that the first keyblock (and the first recovery image associated with the first keyblock) is from a trusted/reliable source. In one or more implementations, the validity of the first keyblock may be determined by verifying a signature of the first keyblock using a key that is stored in read-only firmware (e.g., write-protected partition 210 in FIG. 2). The key is generally provided by a supplier of the recovery image, and a valid keyblock is signed by the supplier. The first keyblock may be contained in the storage device along with the first recovery image. In some aspects, the first keyblock is a part of the first recovery image that is read first by a processor when the processor reads data contained in the first recovery image.

The example process 400 proceeds to block 415 if the first keyblock is determined to be valid. In this case, the first recovery image associated with the first keyblock can be considered a trusted or valid recovery image. At block 415, if the first keyblock is determined to be valid, a first version identifier (e.g., 310 in FIG. 3) associated with the first keyblock is determined. In one or more implementations, the first version identifier is contained in the first keyblock. The first version identifier may provide version information of the first recovery image associated with the first keyblock for example. The version information may be used to determine whether the first recovery image is an older version, same version, or newer version compared to another recovery image. The first version identifier may be a version number, alphanumeric identifier, or other identifier that may be utilized to denote version information.

At block 420, a second version identifier (e.g., 260 in FIG. 2) is determined, where the second version identifier is contained in the computing system 100. In one or more implementations, the second version identifier is stored in writable firmware (e.g., writable partition 250 in FIG. 2). The second version identifier may be stored as part of a second keyblock (e.g., recovery keyblock 255 in FIG. 2). Alternatively or in conjunction, the second version identifier may be stored in the writable firmware as a standalone piece of data that is accessible to a processor of the computing system 100.

In some aspects, the second version identifier may provide version information for an oldest (e.g., lowest) version of a recovery image recommended (e.g., by the supplier) for a recovery mode process. In the case that the version identifier is written in writable firmware, the version identifier may be updated to roll forward the version of the recovery mode recommended for the recovery mode process.

In one or more implementations, the value of the second version identifier may be set as part of an operating system install process during the recovery mode. Alternatively or in conjunction, in one or more implementations, the value of the second version identifier may be updated as part of an autoupdate process or a manual update process (e.g., instructed by a user) when updating the writable firmware (e.g., writable partition 250 in the secondary storage device 200 of FIG. 2) and/or the OS (e.g., OS 140 in the storage device 110 of FIG. 1). The autoupdates or manual updates are generally provided by a supplier (e.g., downloadable from a supplier's server through the Internet, optical disk provided/mailed by the supplier, and so forth).

In one or more implementations, the second keyblock may contain a digital signature. The digital signature may be utilized by the computing system 100 to verify that the second keyblock is from a trusted/reliable source. For example, a cryptographic key stored in a boot stub may be used to verify the digital signature.

At block 425, the first version identifier and the second version identifier are compared with each other. In one or more implementations, the comparison is performed to determine whether the first version identifier is associated with a version of a recovery image that is older than, the same as, or newer than a version of the recovery image that is associated with the second version identifier. For example, a higher version number for a recovery image may be associated with a newer version of the recovery image.

At block 430, a boot sequence from the first recovery image is executed based on the comparison. The boot sequence may include actions such as verifying and booting a kernel from the first recovery image, along with subsequent actions in the recovery process. In one or more implementations, based on results of the comparison, a delay of a predetermined temporal duration may be imposed prior to executing the boot sequence. In one or more implementations, based on results of the comparison, the boot sequence from the first recovery image may be executed subsequent to performing the comparison between the first version identifier and the second version identifier without an imposed delay. The predetermined temporal duration may be set to five minutes or ten minutes for example, although other temporal durations may be utilized.

Figure 5:
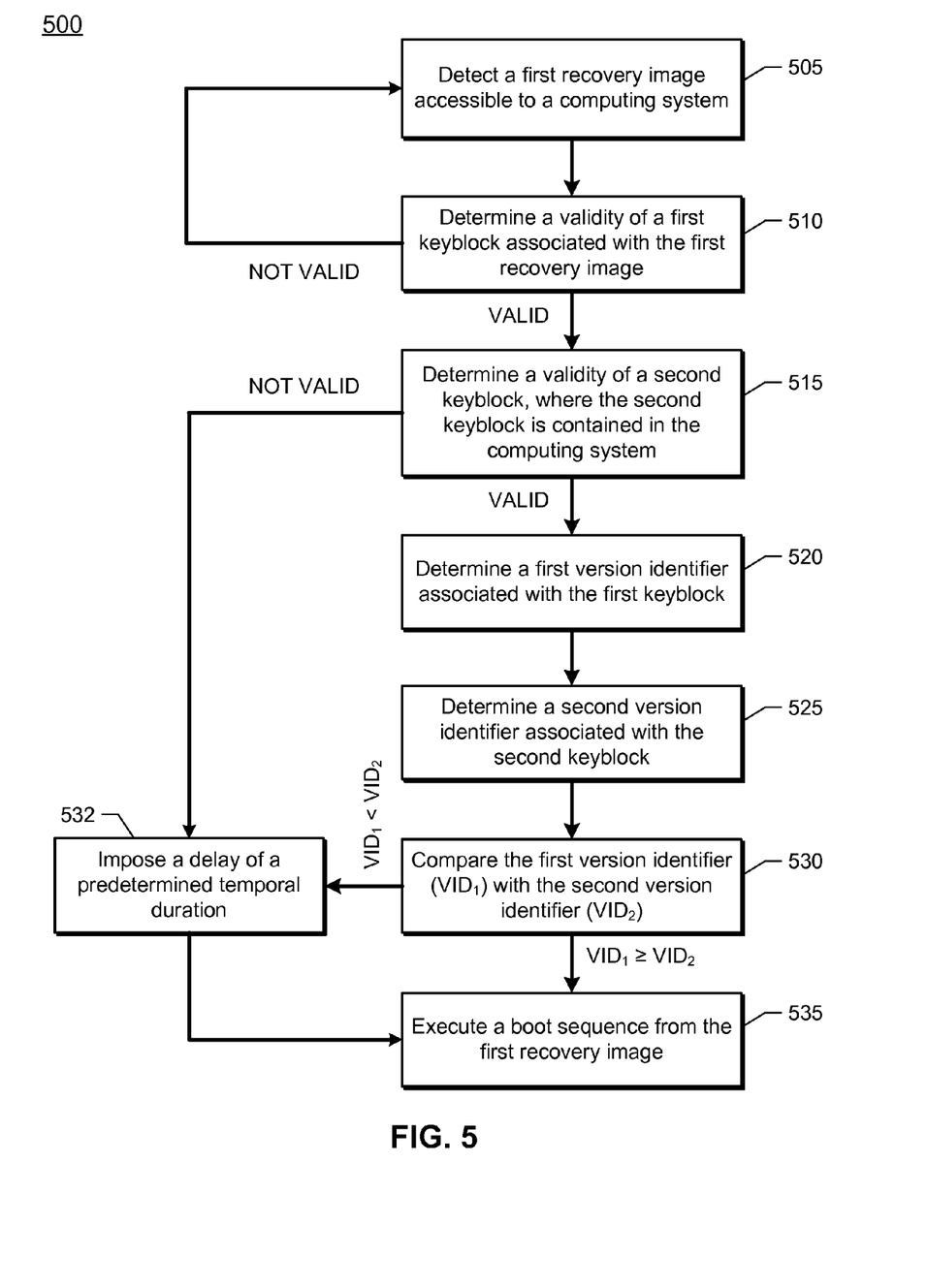

FIG. 5 shows a flow diagram illustrating another example process 500 for executing a boot sequence from a recovery image, in accordance with various aspects of the subject technology. The blocks of the process 500 do not need to be performed in the order shown. In one or more implementations, the description provided for blocks of the example process 400 of FIG. 4 is also applicable to similar blocks of the example process 500 of FIG. 5. It is understood that the depicted order is an illustration of one or more example approaches, and are not meant to be limited to the specific order or hierarchy presented. The blocks can be rearranged, and/or two or more of the blocks can be performed simultaneously. Additional, fewer, and/or different blocks may be performed.

For explanatory purposes, the example process 500 is primarily described herein with reference to the computing system 100 of FIG. 1, with instructions being executed by the processor 105 in the computing system 100. However, the example process 500 is not limited to the computing system 100 of FIG. 1, and the example process 500 may be performed by one or more components of the computing system 100.

At block 505, a first recovery image that is accessible to the computing system 100 is detected. At block 510, a determination is made for the validity of a first keyblock associated with the first recovery image. The example process 500 proceeds back to block 505 if the first keyblock is determined not to be valid. The example process 500 proceeds to block 515 if the first keyblock is determined to be valid.

Figure 7B:
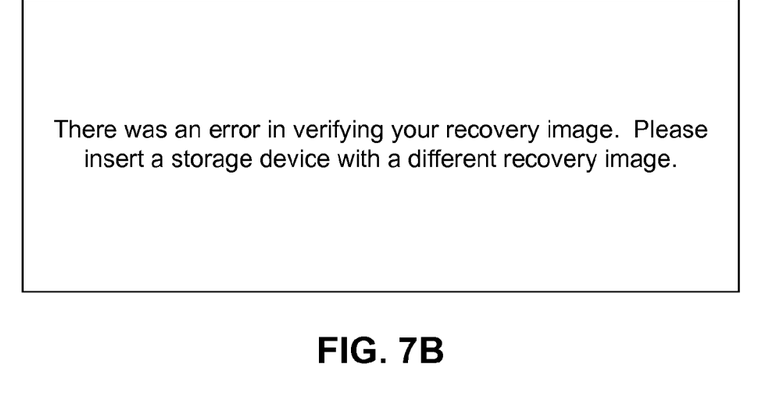

If the first keyblock is determined not to be valid, the example process 500 proceeds back to block 505. The example process 500 may include losing access to the first keyblock and waiting for another recovery image to be accessible to the computing system 100. In one or more implementations, when the first keyblock is determined not to be valid, a screen may be provided for display to a user of the computing system 100 to indicate the status of the validation and/or provide instructions to the user on how to proceed. For example, the screen may indicate to the user that the first keyblock has been determined to not be valid and to request that the user provide a different keyblock (e.g., insert a new storage device with a different recovery image). FIG. 7B provides an example screen that may be provided for display to the user to prompt the user to provide another recovery image. Other screens that include less or more information than the screen shown in FIG. 7B can be utilized. In the case where the first keyblock is determined not to be valid, other data contained in the first keyblock (e.g., version identifier) may be ignored, since the first keyblock (and any information in the first keyblock) is not trusted.

The example process 500 proceeds to block 515 from block 510 if the first keyblock is determined to be valid. At block 515, a validity of a second keyblock is determined, where the second keyblock is contained in the computing system 100. The second keyblock may be contained in writable firmware (e.g., writable partition 250 in FIG. 2) of the computing system. The validity of the second keyblock is determined to verify that the second keyblock is from a trusted/reliable source. In one or more implementations, the validity of the second keyblock may be determined by verifying a signature of the second keyblock using a key that is stored in read-only firmware (e.g., write-protected partition 210 in FIG. 2) of the computing system 100. The key is generally provided by a supplier of the recovery image, and a valid keyblock is signed by the supplier.

Figure 7C:
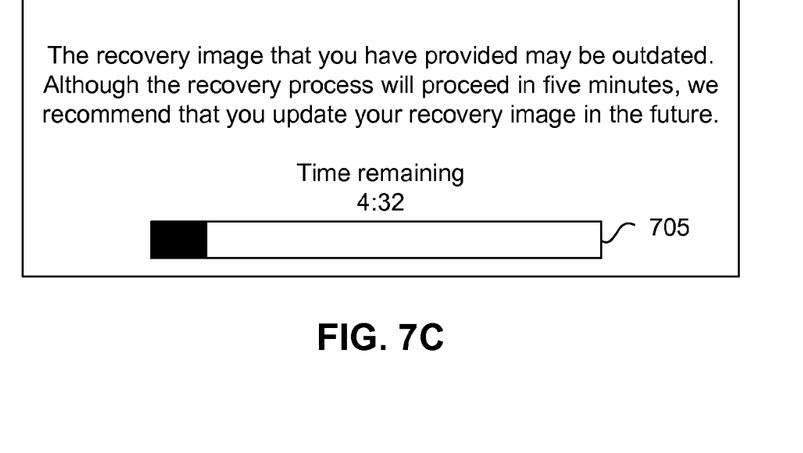

The example process 500 proceeds to block 532 if the second keyblock is determined not to be valid. At block 532, a delay of a predetermined temporal duration is imposed prior to executing a boot sequence from the first recovery image. The predetermined temporal duration may be set to five minutes or ten minutes for example, although other temporal durations may be utilized. When a delay is being imposed, the computing system 100 may provide for display the example screen shown in FIG. 7C that provides the user with a reason for the imposed delay and the time left in the imposed delay (e.g., with both a countdown and a progress bar 705). Other screens that include less or more information than the screen shown in FIG. 7C can be utilized. From block 532, the example process 500 proceeds to block 535. At block 535, a boot sequence from the first recovery image is executed.

The example process 500 proceeds to block 520 from block 515 if the second keyblock is determined to be valid. In some aspects, the second keyblock is not signed, in which case the example process 500 may proceed without performing block 515. In such aspects, the example process 500 may proceed from block 510 directly to block 520 for example.

At block 520, a first version identifier associated with the first keyblock is determined. At block 525, a second version identifier associated with the second keyblock is determined. The second version identifier contained in the second keyblock may be the only part of the second keyblock that is read by the processor during a recovery mode process, in one or more implementations.

At block 530, the first version identifier and the second version identifier are compared with each other. In one or more implementations, the comparison is performed to determine whether the first version identifier is associated with a version of a recovery image that is older than, the same as, or newer than a version of the recovery image that is associated with the second version identifier.

The example process 500 proceeds to block 532 if the first version identifier is associated with a version of a recovery image that is older than a version of the recovery image that is associated with the second version identifier. In this case, the first version identifier may be considered lower than the second version identifier. At block 532, a delay of a predetermined temporal duration is imposed prior to executing a boot sequence from the first recovery image. The predetermined temporal duration may be set to five minutes or ten minutes for example, although other temporal durations may be utilized. The example screen shown in FIG. 7C may be provided for display to the user. From block 532, the example process 500 proceeds to block 535. At block 535, a boot sequence from the first recovery image is executed.

The example process 500 proceeds to block 535 from block 530 if the first version identifier is associated with a version of a recovery image that is the same as or newer than a version of the recovery image that is associated with the second version identifier. At block 535, a boot sequence from the first recovery image is executed.

In one or more implementations, the second version identifier that is contained in the computing system 100, such as in a writable firmware (e.g., writable partition 250 in FIG. 2) of the computing system 100, may provide an oldest version of a recovery image that the computing system 100 can boot from without having a delay imposed. As an example, for a recovery image that has Versions 1 through 5, with Version 5 being the newest, Versions 3 and 4 providing minor enhancements to the recovery image, and with Versions 1 and 2 containing security vulnerabilities, a supplier may decide to set the second version identifier to Version 3.

With further reference to the example, in one or more implementations, the imposing of a delay in executing a boot sequence from the first recovery image for Versions 1 and 2 may be implemented to protect the computing system 100 from an attacker. For example, an attacker may have physical access to the computing system 100 when a user leaves the computing system 100 unattended (either knowingly or not). During this time, the attacker may insert into the computing system 100 an external storage device (e.g., removable storage device 135) with a version of a recovery image with security vulnerabilities (e.g., Version 1 or 2) in order to have the computing system 100 boot into this recovery image so that the attacker can exploit these security vulnerabilities.

The subject technology would detect that the recovery image provided by the attacker is older than that set by the second version identifier and, accordingly, impose a delay. With the imposed delay, the attacker would need to have physical access to the computing system 100 for more than the imposed delay before being able to, for example, execute the boot sequence from the recovery image of the attacker and perform any additional actions that would impair the computing system 100, such as installing malicious software into the computing system 100. In contrast, without the imposed delay, the attacker would have additional time (i.e., time not spent on the delay) to execute the boot sequence from the recovery image of the attacker and perform any additional actions.

Figure 6:
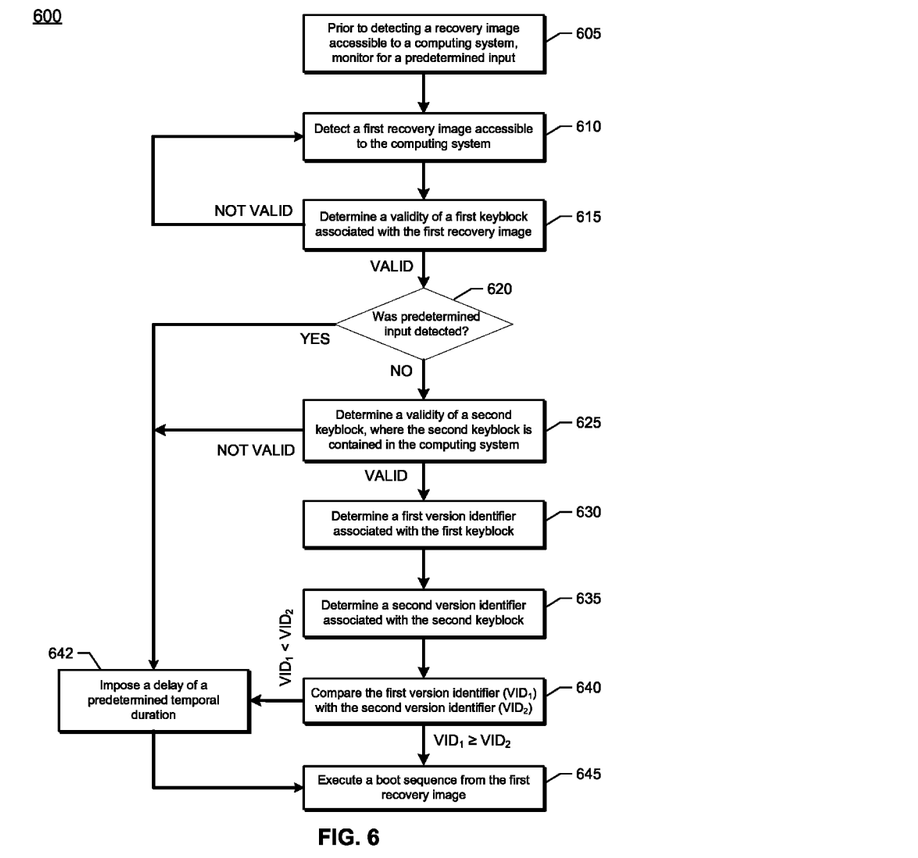

FIG. 6 shows a flow diagram illustrating another example process 600 for executing a boot sequence from a recovery image, in accordance with various aspects of the subject technology. The blocks of the process 600 do not need to be performed in the order shown. In one or more implementations, the description provided for blocks of the example process 400 of FIG. 4 and/or the example process 500 of FIG. 5 is also applicable to similar blocks of the example process 600 of FIG. 6. It is understood that the depicted order is an illustration of one or more example approaches, and are not meant to be limited to the specific order or hierarchy presented. The blocks can be rearranged, and/or two or more of the blocks can be performed simultaneously. Additional, fewer, and/or different blocks may be performed.

For explanatory purposes, the example process 600 is primarily described herein with reference to the computing system 100 of FIG. 1, with instructions being executed by the processor 105 in the computing system 100. However, the example process 600 is not limited to the computing system 100 of FIG. 1, and the example process 600 may be performed by one or more components of the computing system 100.

At block 605, the computing system 100 monitors for a predetermined input prior to detecting a recovery image accessible to the computing system 100. Upon detection of the predetermined input, the computing system 100 may set an internal flag to a particular value for example, to signify that the predetermined input was detected. In one or more implementations, the predetermined input may be provided by a user of the computing system 100 in order to provide instructions to the computing system 100 to not look at a second version identifier contained in computing system 100, such as in writable firmware (e.g., writable partition 250 in FIG. 2) of the computing system 100. Alternatively, in one or more implementations, the computing system 100 may monitor for the predetermined input up until right before reaching block 625.

The predetermined input may depend on a type of computing system 100. For example, for a computing system 100 that is connected to a keyboard, the predetermined input may be a user's pressing of a key or key combination, such as pressing Control+K. As another example, for a computing system 100 that has no external keyboard, such as a tablet, the predetermined input may be a user's pressing down of a Volume Up button for over four seconds and/or a user's performing a particular gesture. The predetermined input may be provided, for example, in documentation accessible to the user, such as on a website of the supplier and/or a user's manual, among others.

At block 610, a first recovery image that is accessible to the computing system 100 is detected. At block 615, a determination is made for the validity of a first keyblock associated with the first recovery image. The example process 600 proceeds back to block 610 if the first keyblock is determined not to be valid. The example process 600 proceeds to block 620 if the first keyblock is determined to be valid.

If the first keyblock is determined not to be valid, the example process 600 proceeds back to block 605. The example process 600 may include losing access to the first keyblock and waiting for another recovery image to be accessible to the computing system 100. In one or more implementations, when the first keyblock is determined not to be valid, a screen may be provided for display to a user of the computing system 100 to indicate the status of the validation and/or provide instructions to the user on how to proceed. The screen shown in FIG. 7B may be provided for display to the user to prompt the user to provide another recovery image.

At block 620, a determination is made as to whether the predetermined input was detected. The determination may be made by checking a value for an internal flag configured to be set to a particular value when the predetermined input is detected for example. In some aspects, the computing system 100 may detect for the predetermined input up until right before determining a validity of a second keyblock.

The example process 600 proceeds to block 642 if the predetermined input was detected. At block 642, a delay of a predetermined temporal duration is imposed prior to executing a boot sequence from the first recovery image. The screen shown in FIG. 7C may be provided for display to the user to provide information regarding the imposed delay. From block 642, the example process 600 proceeds to block 645. At block 645, a boot sequence from the first recovery image is executed.

The example process 600 proceeds to block 625 from block 620 if the predetermined input was not detected. At block 625, a validity of a second keyblock is determined, where the second keyblock is contained in the computing system 100. The example process 600 proceeds to block 642 if the second keyblock is determined not to be valid. At block 642, a delay of a predetermined temporal duration may be imposed prior to executing a boot sequence from the first recovery image. The screen shown in FIG. 7C may be provided for display to the user to provide information regarding the imposed delay. From block 642, the example process 600 proceeds to block 645. At block 645, a boot sequence from the first recovery image is executed.

The example process 600 proceeds to block 630 from block 625 if the second keyblock is determined to be valid.

At block 630, a first version identifier associated with the first keyblock is determined. At block 635, a second version identifier associated with the second keyblock is determined.

At block 640, the first version identifier and the second version identifier are compared with each other. The example process 600 proceeds to block 642 if the first version identifier is associated with a version of a recovery image that is older than a version of the recovery image that is associated with the second version identifier. At block 642, a delay of a predetermined temporal duration is imposed prior to executing a boot sequence from the first recovery image. The screen shown in FIG. 7C may be provided for display to the user to provide information regarding the imposed delay. From block 642, the example process 600 proceeds to block 645. At block 645, a boot sequence from the first recovery image is executed.

The example process 600 proceeds to block 645 from block 640 if the first version identifier is associated with a version of a recovery image that is the same as or newer than a version of the recovery image that is associated with the second version identifier. At block 645, a boot sequence from the first recovery image is executed.

In one or more implementations, the detection of the predetermined input allows the computing system 100 to bypass reading any recovery image data contained in writable firmware (e.g., writable partition 250 in FIG. 2) of the computing system 100, including the second version identifier. For example, the recovery image data contained in the writable firmware may be constructed, either advertently or inadvertently, in some manner that causes the computing system 100 to crash when the computing system 100 accesses the recovery image data. As a more particular example, a recovery keyblock verification code contained in read-only firmware (e.g., write-protected partition 210 in FIG. 2) of the computing system 100 may crash when accessing the recovery image data contained in the writable firmware. A user whose computing system 100 crashes when performing a recovery mode process may be able to successfully boot the recovery image in a removable storage medium by providing the predetermined input, if the crashes are due to recovery image data contained in the writable firmware.

In one or more implementations, when the predetermined input is detected, a delay of a predetermined temporal duration is imposed prior to booting from the first recovery image. If an attacker were to provide the predetermined input, the attacker would need to have physical access to the computing system 100 for more than the imposed delay before being able to, for example, execute the boot sequence from the recovery image of the attacker and perform any additional actions that would impair the computing system 100, such as installing malicious software into the computing system 100.

In accordance with one or more implementations of the subject technology, a second version identifier contained in a computing system is compared with a first version identifier contained in an external storage device (e.g., block 530 in FIG. 5). The comparison is utilized to determine when to execute a boot sequence from a recovery image contained in the external storage device. The version identifier may be contained in writable firmware of the computing system. The value of the second version identifier may be set as part of an operating system install process during the recovery mode. Alternatively or in conjunction, the value of the second version identifier may be updated as part of an autoupdate process or a manual update process (e.g., instructed by a user) when updating the writable firmware (e.g., writable partition 250 in FIG. 2) and/or the OS (e.g., OS 140 in the storage device 110 of FIG. 1). The autoupdates or manual updates are generally provided by a supplier (e.g., downloadable from a supplier's server, optical disk provided/mailed by the supplier, and so forth).

In one or more implementations, information of a user may be stored in an internal drive of the computing system, and the information may be encrypted with a key that is stored inside a Trusted Platform Module (TPM). When the first version identifier is lower than the second version identifier, the delay is imposed and any information in the TPM is cleared prior to executing the first recovery image. Although the information in the TPM may be cleared as part of the recovery process, clearing the information in the TPM prior to executing the recovery process from the first recovery image may provide additional protection to the information of the user.

The subject technology provides a computing system with a capability to execute a boot sequence from a recovery image that is outdated relative to a version identifier stored in a computing device, while reducing risks associated with allowing the computing system to execute a boot sequence from the outdated recovery image. The outdated recovery image may be the only recovery image accessible to a user of the computing system at a given moment in time for example, in which case it would be undesirable not to allow the user to boot the computing system from the outdated recovery image. Risks associated with booting from the outdated recovery image may be reduced, since in the case that an attacker is attempting to have the computing device boot from an outdated recovery image, a delay would be imposed, requiring the attacker to maintain physical access to the computing system for a longer period of time prior to being able to perform actions that impair the computing system.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a machine or computer. A computer readable medium can be one or more computer readable media and a machine readable medium can be one or more machine readable media. These terms exclude any wireless signals, wired download signals, and any other ephemeral signals.

To provide for interaction with a user, implementations of the subject matter described in this specification can include usage of a computer having a display device, e.g., CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A computing system, comprising:
   one or more processors; and
   a non-transitory machine-readable medium comprising instructions stored therein, which when executed by the one or more processors, cause the one or more processors to perform operations comprising:
   detecting a first recovery image accessible to the computing system;
   determining a validity of a first keyblock associated with the first recovery image;
   if the first keyblock is determined to be valid, determining a first version identifier associated with the first keyblock;
   determining a second version identifier, wherein the second version identifier is contained in the computing system;
   comparing the first version identifier with the second version identifier;
   determining whether to impose a delay of a predetermined temporal duration prior to executing a boot sequence from the first recovery image based at least on the comparison; and
   executing the boot sequence from the first recovery image based on determining whether to impose the delay.

2. The computing system of claim 1, wherein the second version identifier is associated with a second keyblock that is contained in the computing system, the operations further comprising:
   determining a validity of the second keyblock, wherein the determining the second version identifier and the comparing the first version identifier with the second version identifier are performed when the second keyblock is determined to be valid.

3. The computing system of claim 2, wherein the operations further comprise:
   imposing the delay of the predetermined temporal duration prior to executing the boot sequence from the first recovery image when the first keyblock is determined to be valid and the second keyblock is determined to not be valid.

4. The computing system of claim 2, wherein the operations further comprise:
   detecting a predetermined input; and
   imposing the delay of the predetermined temporal duration prior to executing the boot sequence from the first recovery image when the predetermined input is detected,
   wherein the determining the validity of the second keyblock and determining the second version identifier are not performed when the predetermined input is detected.

5. The computing system of claim 1, wherein the operations further comprise imposing the delay of the predetermined temporal duration prior to executing the boot sequence from the first recovery image when the first version identifier is associated with a version of a recovery image that is older than a version of the recovery image associated with the second version identifier.

6. The computing system of claim 5, wherein the operations further comprise providing for display a screen indicating the imposed delay.

7. The computing system of claim 1, wherein the operations further comprise executing the boot sequence without imposing the delay of the predetermined temporal duration prior to executing the boot sequence from the first recovery image when the first version identifier is associated with a version of a recovery image that is not older than a version of the recovery image associated with the second version identifier.

8. The computing system of claim 1, wherein the operations further comprise:
   detecting a predetermined input; and
   imposing the delay of the predetermined temporal duration prior to executing the boot sequence from the first recovery image when the predetermined input is detected, wherein the determining the second version identifier is not performed when the predetermined input is detected.

9. The computing system of claim 1, wherein the first recovery image and the first keyblock are contained in a storage device communicably connected to the computing system.

10. The computing system of claim 9, wherein the storage device is a removable machine-readable storage device connected to the computing system.

11. The computing system of claim 1, further comprising a non-volatile memory, wherein the second version identifier is contained in a writable portion of the non-volatile memory.

12. A machine-implemented method, comprising:
   detecting a valid recovery image accessible to a computing system;
   determining a first version identifier associated with the valid recovery image;
   determining a second version identifier;
   comparing the first version identifier with the second version identifier;
   determining whether to impose a delay of a predetermined temporal duration prior to executing a boot sequence from the valid recovery image based at least on the comparison; and
   executing the boot sequence from the valid recovery image based on determining whether to impose the delay.

13. The method of claim 12, wherein the second version identifier is associated with a second keyblock that is contained in the computing system, the method further comprising:
   determining a validity of the second keyblock, wherein the determining the second version identifier and the comparing the first version identifier with the second version identifier are performed when the second keyblock is determined to be valid.

14. The method of claim 13, further comprising:
   imposing the delay of the predetermined temporal duration prior to executing the boot sequence from the valid recovery image when the second keyblock is determined to not be valid.

15. The method of claim 13, further comprising:
   detecting a predetermined input; and
   imposing the delay of the predetermined temporal duration prior to executing the boot sequence from the valid recovery image when the predetermined input is detected,
   wherein the determining the validity of the second keyblock and determining the second version identifier are not performed when the predetermined input is detected.

16. The method of claim 12, further comprising imposing the delay of the predetermined temporal duration prior to executing the boot sequence from the valid recovery image when the first version identifier is associated with a version of a recovery image that is older than a version of the recovery image associated with the second version identifier.

17. The method of claim 12, further comprising executing the boot sequence without imposing the delay of the predetermined temporal duration prior to executing the boot sequence from the valid recovery image when the first version identifier is associated with a version of a recovery image that is not older than a version of the recovery image associated with the second version identifier.

18. A non-transitory machine-readable medium comprising instructions stored therein, which when executed by a system, cause the system to perform operations comprising:
   detecting a valid recovery image accessible to the system;
   determining a first version identifier associated with the valid recovery image;
   determining a second version identifier, wherein the second version identifier is contained in the system;
   determining, based on the first version identifier and the second version identifier, whether to impose a delay of a predetermined temporal duration prior to executing a boot sequence from the valid recovery image; and
   executing the boot sequence from the valid recovery image based on determining whether to impose the delay.

19. The non-transitory machine-readable medium of claim 18, wherein the delay is not imposed when the first version identifier is associated with a version of a recovery image that is not older than a version of the recovery image associated with the second version identifier.

20. The non-transitory machine-readable medium of claim 18, wherein the delay is imposed when the first version identifier is associated with a version of a recovery image that is older than a version of the recovery image associated with the second version identifier.

* * * * *